United States Patent
Okada et al.

(10) Patent No.: US 10,224,122 B2
(45) Date of Patent: Mar. 5, 2019

(54) REACTOR INSTRUMENTATION SYSTEM AND REACTOR

(71) Applicant: Hitachi, Ltd., Tokyo (JP)

(72) Inventors: Kouichi Okada, Tokyo (JP); Takahiro Tadokoro, Tokyo (JP); Katsunori Ueno, Tokyo (JP); Yasushi Nagumo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 15/153,896

(22) Filed: May 13, 2016

(65) Prior Publication Data

US 2017/0062084 A1 Mar. 2, 2017

(30) Foreign Application Priority Data

Aug. 31, 2015 (JP) .................... 2015-169980

(51) Int. Cl.
*G21C 17/108* (2006.01)
*G21C 19/28* (2006.01)

(52) U.S. Cl.
CPC .......... *G21C 17/108* (2013.01); *G21C 19/28* (2013.01)

(58) Field of Classification Search
CPC .............................. G21C 17/108; G21C 19/28
See application file for complete search history.

(56) References Cited

U.S. PATENT DOCUMENTS

| | | | |
|---|---|---|---|
| 3,130,307 A * | 4/1964 | Russell | G01T 3/00 250/391 |
| 3,207,667 A * | 9/1965 | Campbell | G01T 3/00 159/DIG. 17 |
| 3,845,311 A * | 10/1974 | Fujii | G21C 17/108 250/390.01 |
| 5,108,694 A * | 4/1992 | Stucker | G21C 17/10 376/245 |
| 5,225,149 A * | 7/1993 | Banda | G21C 17/112 376/254 |
| 5,745,538 A * | 4/1998 | Heibel | G01T 3/006 376/153 |
| 6,236,698 B1 * | 5/2001 | Hirukawa | G21C 17/108 376/245 |

(Continued)

FOREIGN PATENT DOCUMENTS

| | | |
|---|---|---|
| JP | 42-5038 B | 3/1967 |
| JP | 03-065696 A | 3/1991 |

(Continued)

OTHER PUBLICATIONS

Japanese Office Action received in corresponding Japanese Application No. 2015-169980 dated Nov. 20, 2018.

*Primary Examiner* — Lily C Garner

(74) *Attorney, Agent, or Firm* — Mattingly & Malur, PC

(57) ABSTRACT

An object of the invention is to provide a reactor instrumentation system that can be easily repaired or replaced. The invention includes: an instrumentation tube provided in a reactor core; a gas flow pipe provided in the instrumentation tube; a suction mechanism for supplying gas containing oxygen to the gas flow pipe; and a nuclide analysis device for measuring a nuclide in the gas in the gas flow pipe. According to the invention, it is possible to provide a reactor instrumentation system that can be easily repaired or replaced.

7 Claims, 6 Drawing Sheets

(56) References Cited

U.S. PATENT DOCUMENTS

| | | | | |
|---|---|---|---|---|
| 8,175,210 B2* | 5/2012 | Fawks | .................. | G21C 17/108 376/245 |
| 8,238,509 B2* | 8/2012 | Moen | ...................... | G01T 7/005 376/245 |
| 8,503,599 B2* | 8/2013 | Koste | ..................... | G01K 11/30 376/244 |
| 9,207,335 B2* | 12/2015 | Popa | ........................ | G01T 3/006 |
| 2008/0240330 A1* | 10/2008 | Holden | .................... | G21G 1/12 376/190 |
| 2010/0104060 A1 | 4/2010 | Koste et al. | | |

FOREIGN PATENT DOCUMENTS

| | | |
|---|---|---|
| JP | 2010-107498 A | 5/2010 |
| JP | 2012-7889 A | 1/2012 |

* cited by examiner

[FIG. 1]
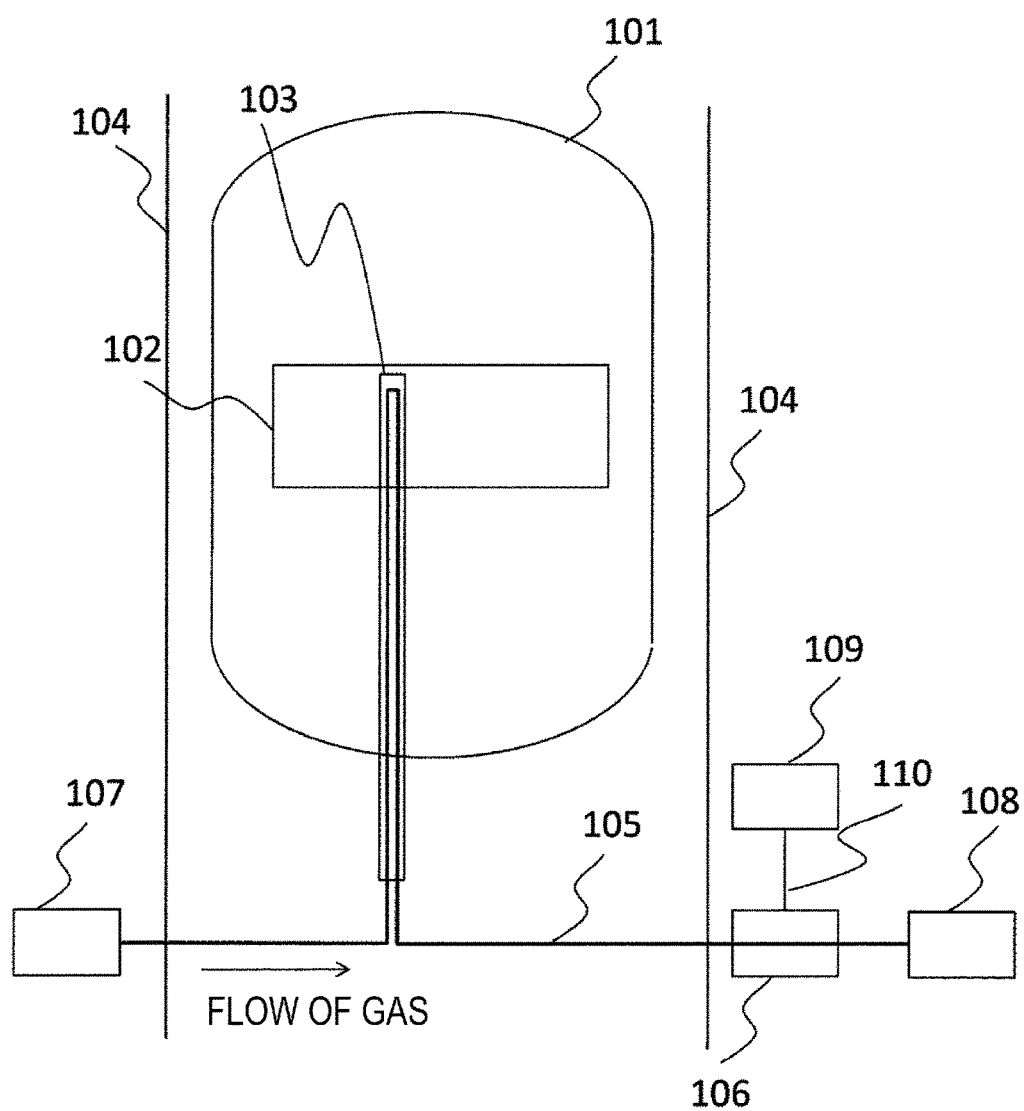

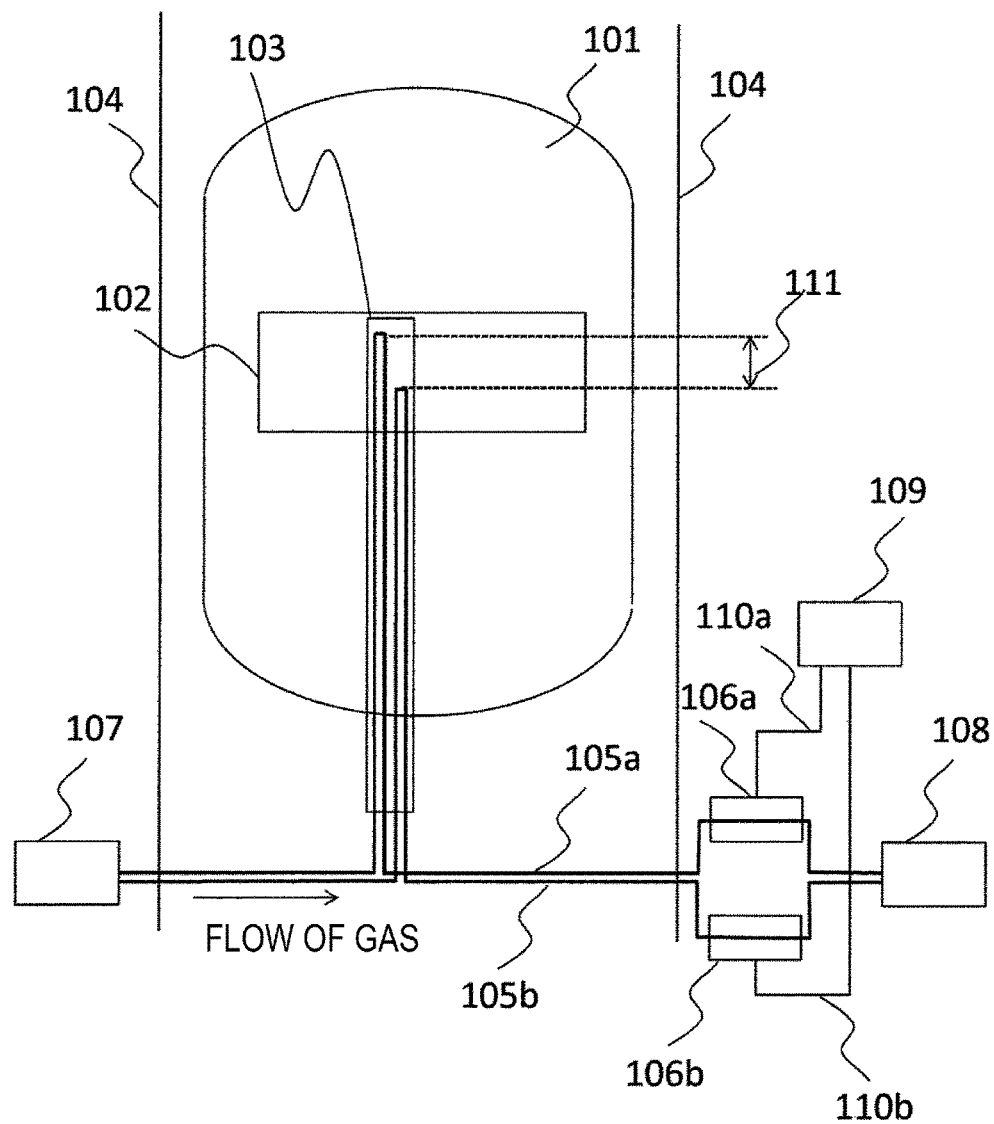
[FIG. 2]

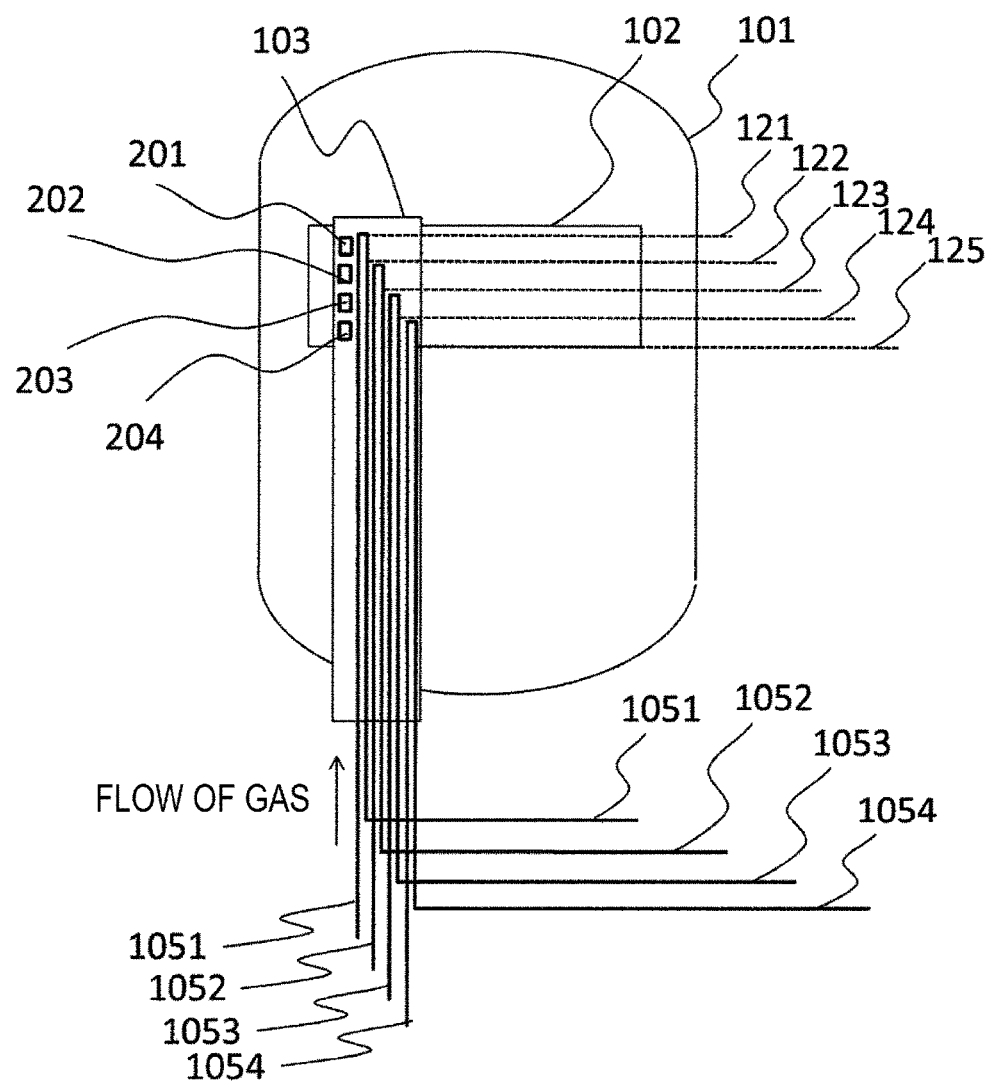

[FIG. 4]
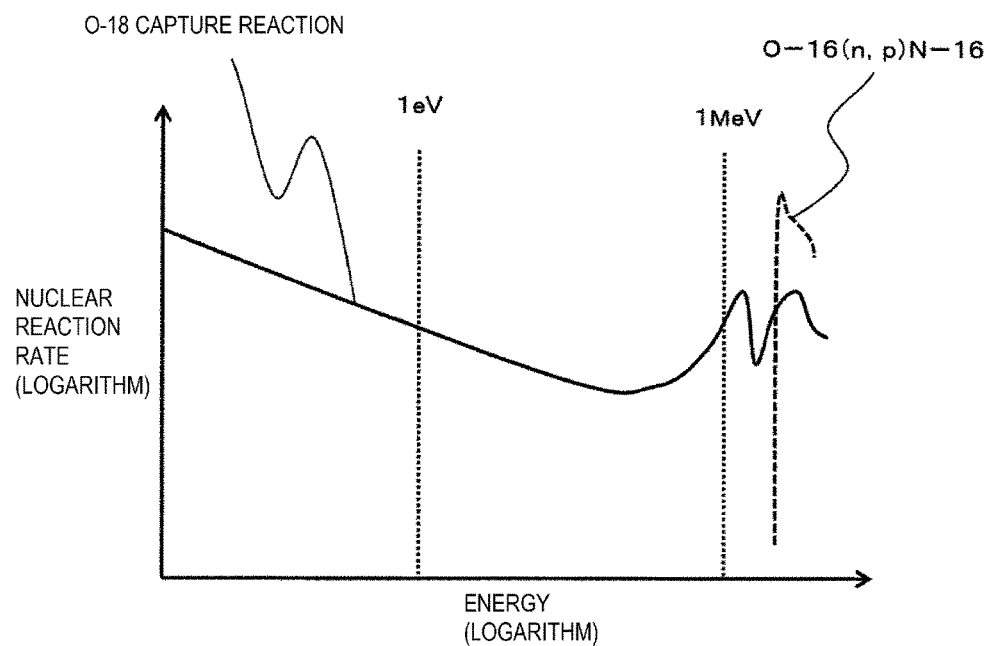

[FIG. 5]
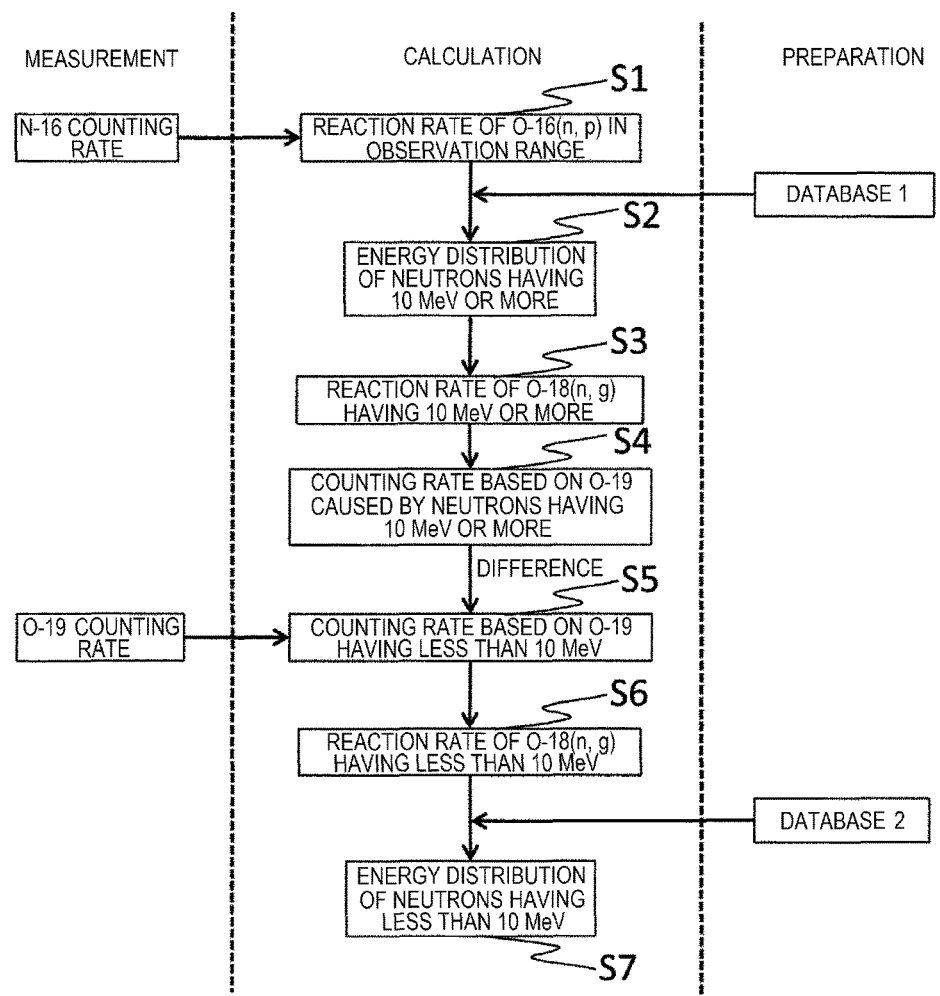

[FIG. 6]
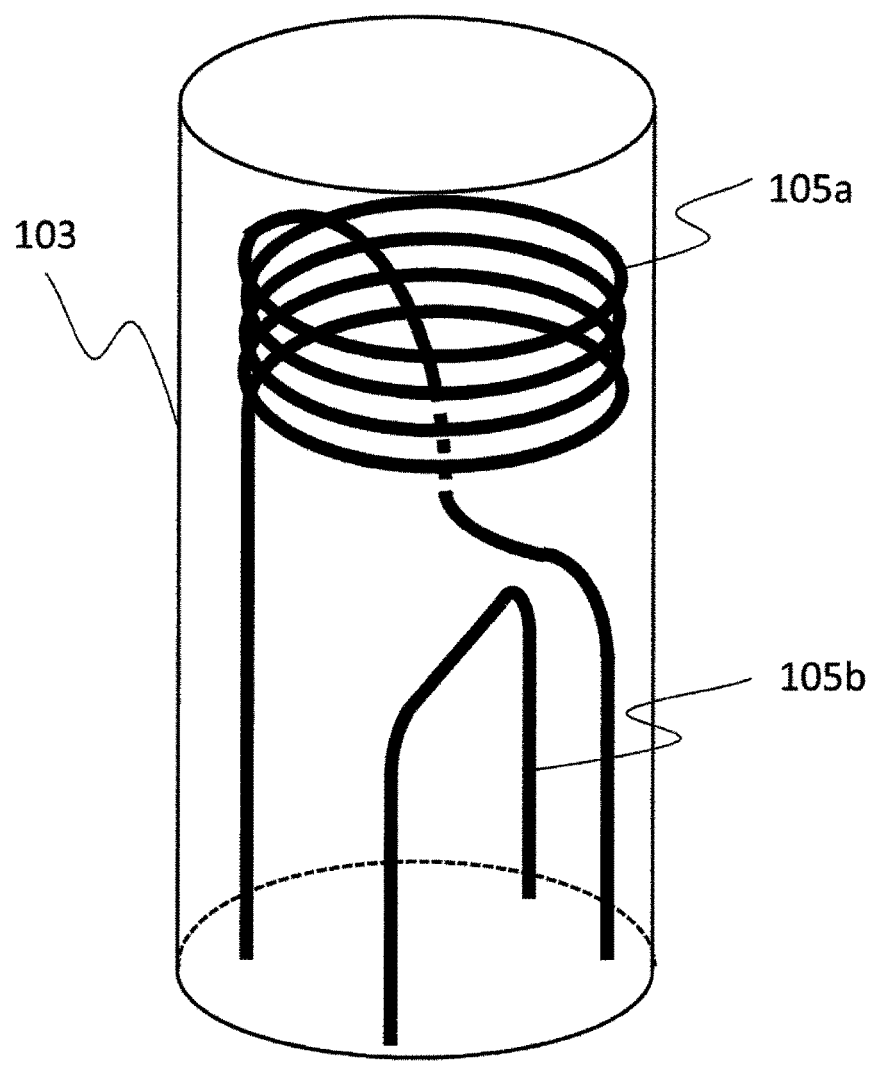

REACTOR INSTRUMENTATION SYSTEM AND REACTOR

TECHNICAL FIELD

The present invention relates to a reactor instrumentation system and a reactor.

BACKGROUND ART

A background technology of this technology is a reactor instrumentation system (nuclear instrumentation system) for monitoring reactor power. Examples of the reactor instrumentation system (nuclear instrumentation system) are a local power range monitor (LPRM) and a traversing incore probe (TIP) system. The TIP is used for calibrating a local power range monitor for monitoring power at the time of operating a reactor. A fission chamber is used for the local power range monitor and measures neutrons to output signals (generally, current values). The number of measured neutrons correlates to reactor power, and therefore the reactor power is monitored by the local power range monitor. Generally, a fission chamber is also used for a traversing incore probe (TIP) system. In the case where the local power range monitor is calibrated, the traversing incore probe system is inserted into a position adjacent to a neutron detector for the local power range monitor serving as a target. The traversing incore probe system measures neutrons at such an inserted position to acquire signals in accordance with power, thereby calibrating sensitivity of the neutron detector for the local power range monitor.

Another method is, for example, a method using a gamma thermometer disclosed in JP-A-3-65696 (PTL 1). The gamma thermometer is arranged to be adjacent to a local power range monitor, has no driving mechanism, and is always in an arranged state. The gamma thermometer is different from the TIP in that the gamma thermometer measures gamma rays. The gamma thermometer measures a heating temperature caused by gamma rays to acquire signals corresponding to power in a reactor, thereby calibrating sensitivity of a neutron detector for the local power range monitor.

CITATION LIST

Patent Literature

PTL 1: JP-A-3-65696

SUMMARY OF INVENTION

Technical Problem

A neutron detector for a local power range monitor in a current boiling water reactor is calibrated by a TIP. The TIP moves to another location as necessary, and a single TIP calibrates a plurality of neutron detectors for a local power range monitor. Therefore, signals that are obtained from the local power range monitor while the TIP is not being inserted receive two influences, i.e., a change in power in the reactor and deterioration in sensitivity.

The reactor instrumentation system is arranged in a reactor pressure vessel and therefore cannot be easily repaired or replaced when the reactor instrumentation system is broken. As an example of a measurement device for calibrating a neutron detector for a local power range monitor, in the case where a TIP is used, a mechanism for inserting the detector into an instrumentation tube provided in a reactor pressure vessel is needed. A driving mechanism is configured so that the detector for the TIP moves in a primary containment vessel and in the reactor pressure vessel, and therefore, in the case where electrical failure occurs at the time of inserting the TIP, repair or replacement thereof cannot be easily performed. This also occurs when the detector for the TIP is broken. In the case of the gamma thermometer, the driving mechanism is not needed, but a detection unit is always arranged in the instrumentation tube. Thus, in the case where the gamma thermometer is broken, repair or replacement thereof is difficult.

In view of the circumstances, an object of the invention is to provide a reactor instrumentation system that can be easily repaired or replaced.

Solution to Problem

The invention includes: an instrumentation tube provided in a reactor core; a gas flow pipe provided in the instrumentation tube; a suction mechanism for supplying gas containing oxygen to the gas flow pipe; and a nuclide analysis device for measuring a nuclide in the gas in the gas flow pipe.

Advantageous Effects of Invention

According to the invention, it is possible to provide a reactor instrumentation system that can be easily repaired or replaced.

BRIEF DESCRIPTION OF DRAWINGS

FIG. 1 illustrates a concept of a system in the invention.
FIG. 2 illustrates a monitoring/calibrating method at an arbitrary position in the invention.
FIG. 3 illustrates a method for calibrating neutron detectors for a local power range monitor in the invention.
FIG. 4 shows reaction probability of oxygen isotopes with energy of neutrons.
FIG. 5 shows a method for estimating energy distribution of neutrons in a reactor in the invention.
FIG. 6 illustrates an example of a method for arranging pipes in the invention.

DESCRIPTION OF EMBODIMENTS

Hereinafter, examples will be described with reference to the drawings.

EXAMPLE 1

FIG. 1 illustrates a concept of a reactor instrumentation system in this example. A basic concept of the reactor instrumentation system in this example is to arrange a gas flow pipe 105 in an instrumentation tube 103. The gas flow pipe 105 connects a suction mechanism 107 to the inside of a reactor containment vessel 104 and is further connected to the inside of a reactor pressure vessel 101. The gas flow pipe 105 exists in the instrumentation tube 103 in the reactor pressure vessel 101. The gas flow pipe 105 is provided to monitor power in a reactor core 102, and therefore a part of the gas flow pipe 105 in the instrumentation tube 103 exists in the reactor core 102. The gas flow pipe 105 that has passed through the reactor core 102 is connected to a nuclide analysis device 106 provided outside the containment vessel 104 via the reactor pressure vessel 101 and the instrumentation tube 103. The nuclide analysis device 106 measures gamma rays emitted from gas in the gas flow pipe 105. The gas flow pipe 105 is finally connected to an exhaust mechanism 108.

Gas containing oxygen atoms flows through the gas flow pipe 105. The gas is fed from the suction mechanism 107 having functions needed to cause gas to flow, such as a pump and a tank. Oxygen atomic nuclei in the gas flow pipe 105 undergo a nuclear reaction with neutrons in the reactor core 102. O-18 becomes O-19 through a neutron capture reaction, and O-16 becomes N-16 through a (n, p) reaction. O-19 causes $\beta$-decay with a half-life of about 27 seconds to become F-19 and emits gamma rays of 1357 keV. N-16 causes $\beta$-decay with a half-life of about 7 seconds to become O-16 and emits gamma rays of 6128 keV. When one or both of those gamma rays are quantified by the nuclide analysis device 106, a reaction rate in the reactor core 102 can be calculated. Thus, it is possible to estimate an irradiation amount of neutrons on the basis of the calculated reaction rate. A generation amount of neutrons and reactor power are correlated with each other, and therefore the reactor power can be monitored by using a method in this example.

A measurement result or a quantification result from the nuclide analysis device 106 is transmitted to a monitoring device 109 via a transmission cable 110. The monitoring device 109 monitors the number of neutrons, a neutron flux, or reactor power. Herein, a reason why the measurement result or the quantification result is described as output signals from the nuclide analysis device 106 is that, in calculation and estimation leading to a final monitoring target, a scope covered by the nuclide analysis device 106 and a scope covered by the monitoring device 109 do not need to be clearly separated. Further, a reason why the number of neutrons, a neutron flux, or reactor power is described as the monitoring target of the monitoring device 109 is that the monitoring target depends on a role of the monitoring device, and the monitoring device may have functions of monitoring two or all three thereof.

Gas flowing through the gas flow pipe 105 only needs to contain oxygen, and may be, for example, air, oxygen, carbon monoxide, carbon dioxide, nitrogen monoxide, nitrogen dioxide, or water vapor. In particular, carbon dioxide is inert and has no risk of combustion or the like and is therefore handled with ease.

A detector of the nuclide analysis device 106 needs to have satisfactory energy resolution that separates gamma rays from the outside expected in an environment in which the nuclide analysis device 106 is arranged from gamma rays emitted in accordance with decay of O-19 or N-16. Even in the case where those gamma rays are separable, when a large number of gamma rays are incident from the outside in the environment in which the nuclide analysis device 106 is arranged and a counting rate thereof is high, it is necessary to arrange a shielding member to reduce gamma rays incident from the outside.

The suction mechanism 107 includes a mechanism such as a pump for controlling a flow rate and can feed gas at a constant flow rate. An optimal value of the flow rate is determined on the basis of a neutron irradiation time and a radioactivity attenuation time after neutron irradiation in the reactor core 102 and a measurement time in the nuclide analysis device 106, and therefore the optimal value depends on a distance between the instrumentation tube 103 and the nuclide analysis device 106.

As described above, because the instrumentation tube provided in the reactor core, the gas flow pipe provided in the instrumentation tube, and the suction mechanism for supplying gas containing oxygen to the gas flow pipe are provided, it is possible to estimate an amount of neutrons in the reactor core by using the gas containing oxygen flowing through the gas flow pipe. Further, because it is unnecessary to provide a driving device in the reactor pressure vessel, it is possible to suppress an influence of breakage of the driving device. Furthermore, because it is unnecessary to provide a neutron detector for a local power range monitor or a traversing incore probe system in the reactor, there is no need to take out the neutron detector to the outside, and therefore it is possible to easily repair or replace the reactor instrumentation system.

EXAMPLE 2

In this example, a method for monitoring reactor power or a neutron flux at an arbitrary position will be described with reference to FIG. 2. In FIG. 2, gas flow pipes that are different in length are arranged. Although, for convenience of illustration, the two gas flow pipes are illustrated to be separated from each other, the two gas flow pipes may be arranged to be in contact with each other or may be arranged at a distance equivalent to contact. A measurement target range 111 in the reactor core 102 is a height through which a long gas flow pipe 105a passes but a short gas flow pipe 105b does not pass. Herein, although the measurement target range is expressed as a height for convenience of explanation, the measurement target range 111 is not monitored as a height of a target in the whole region of the reactor core 102 but the height of the measurement target range 111 in the instrumentation tube 103 or in the vicinity of the instrumentation tube 103 is a monitoring range.

The long gas flow pipe 105a of the two gas flow pipes has a longer neutron irradiation time. Therefore, the number of nuclear reactions of carbon dioxide flowing through the long gas flow pipe 105a is larger than the number of nuclear reactions of carbon dioxide flowing through the short gas flow pipe 105b and generates more O-19 and N-16.

The long gas flow pipe 105a is connected to a nuclide analysis device 106a for the long gas flow pipe, and a nuclide in the long gas flow pipe 105a is analyzed. Similarly, the short gas flow pipe 105b is connected to a nuclide analysis device 106b for the short gas flow pipe, and a nuclide in the short gas flow pipe 105b is analyzed. Although, in FIG. 2, the individual nuclide analysis devices are illustrated to be separated from each other for convenience of explanation, the nuclide analysis devices may be arranged at adjacent positions unless the nuclide analysis devices do not receive an influence of gamma rays emitted from the other gas flow pipe. In the case where a shielding member is used, a detector for the nuclide analysis device 106a for the long gas flow pipe and a detector for the nuclide analysis device 106b for the short gas flow pipe may be arranged in an integrated shielding member.

Output signals from the nuclide analysis device 106a for the long gas flow pipe are transmitted to the monitoring device 109. Similarly, output signals from the nuclide analysis device 106b for the short gas flow pipe are also transmitted to the monitoring device 109. The monitoring device 109 calculates the number of nuclear reactions that has occurred in the measurement target range 111 on the basis of a difference between measurement values or quantification values. Based on the resultant number of nuclear reactions, the number of neutrons, a neutron flux, or reactor power is calculated and monitored.

EXAMPLE 3

In the above example, a method for monitoring reactor power has been described. In this example, a method and a structure for calibrating a neutron detector for a local power range monitor on the basis of the monitoring method described above will be described with reference to FIG. 3.

A boiling water reactor includes an assembly in which four neutron detectors for a local power range monitor are arranged in an instrumentation tube for a local power range monitor. In FIG. 3, four neutron detectors 201 to 204 for a local power range monitor and four gas flow pipes 1051 to 1054 are inserted into the instrumentation tube 103. Signals (generally, current) obtained when neutrons are detected at the neutron detectors for a local power range monitor are measured and output thereof is monitored via transmission cables, but illustration of the assembly and the cables is omitted in FIG. 3.

Because the two gas flow pipes that are different in length are used as described in Example 2, a neutron flux in an arbitrary range can be monitored. Therefore, in order to calibrate a single neutron detector for a local power range monitor, two gas flow pipes are used. However, the shortest gas flow pipe 1054 solely calibrates the neutron detector 204 for a local power range monitor.

Hereinafter, specific description will be made by using a concept of monitoring boundaries 121 to 125 for convenience of explanation. Power between the monitoring boundary 121 and the monitoring boundary 122 is monitored by using the neutron detector 201 for a local power range monitor. The corresponding gas flow pipes are the gas flow pipe 1051 and the gas flow pipe 1052. By the same process as the process in Example 2, the number of nuclear reactions between the monitoring boundary 121 and the monitoring boundary 122 can be obtained on the basis of a difference between a measurement result of gamma rays emitted from O-19 or N-16 in the gas flow pipe 1051 and a measurement result of gamma rays emitted from O-19 or N-16 in the gas flow pipe 1052. The neutron detector 201 for a local power range monitor is calibrated on the basis of the number of nuclear reactions. Similarly, power in a range between the monitoring boundary 122 and the monitoring boundary 123 is monitored by the neutron detector 202 for a local power range monitor, and calibration is performed on the basis of the number of nuclear reactions calculated by using the gas flow pipe 1052 and the gas flow pipe 1053. Power in a range between the monitoring boundary 123 and the monitoring boundary 124 is monitored by the neutron detector 203 for a local power range monitor, and calibration is performed on the basis of the number of nuclear reactions calculated by using the gas flow pipe 1053 and the gas flow pipe 1054. Power in a range between the monitoring boundary 124 and the monitoring boundary 125 is monitored by using the neutron detector 204 for a local power range monitor, and calibration is performed on the basis of the number of nuclear reactions calculated by using the gas flow pipe 1054.

Herein, an example where four neutron detectors for a local power range monitor are arranged in a single instrumentation tube has been described. Note that, even in the case where a reactor includes less than four or more than four neutron detectors for a local power range monitor, similar calibration can be performed by increasing or decreasing the number of gas flow pipes in accordance with the number of neutron detectors for a local power range monitor on the basis of the similar idea.

EXAMPLE 4

Reactions that can be used in the gas flow pipes are a neutron capture reaction of O-18 (hereinafter, referred to as "O-18 (n, g) O-19 reaction") and a (n, p) reaction of O-16. FIG. 4 schematically shows a relationship between those reactions and neutron energy. The (n, p) reaction of O-16 has threshold energy of about 10 MeV and is a reaction occurring only with high-energy neutrons. On the contrary, the neutron capture reaction of O-18 is a reaction occurring in a wide energy range, and reaction probability with low energy is high. Therefore, when generation amounts of O-19 and N-16 generated in the respective nuclear reactions in the reactor core are calculated, it is possible to estimate approximate energy distribution of neutrons in the reactor core. Hereinafter, an example of a method for estimating neutrons in the reactor core will be described.

In FIG. 5, steps of estimating energy distribution of neutrons are divided into three stages of measurement, calculation, and preparation. First, a reaction rate of an O-16(n, p)N-16 reaction in an observation range is calculated on the basis of a N-16 counting rate obtained by measuring N-16 (Step S1). Energy distribution of neutrons having about 10 MeV or more is calculated by using a database 1 on the basis of this reaction rate (Step S2). The database will be described below. A reaction rate of the O-18 (n, g) O-19 reaction caused by neutrons having 10 MeV or more at an observation position is calculated on the basis of this energy distribution of neutrons having about 10 MeV or more (Step S3). With this, an amount of O-19 generated by neutrons having about 10 MeV or more is obtained, and therefore an amount of O-19 existing at a measurement position is also obtained. Then, a counting rate of gamma rays emitted by O-19 caused by neutrons having about 10 MeV or more is calculated (Step S4). The counting rate of gamma rays emitted from N-16 is calculated and the counting rate of gamma rays emitted from O-19 is also obtained, and therefore a difference is obtained by subtracting an estimation value of the counting rate derived from O-19 caused by neutrons having 10 MeV or more from a counting rate derived from the measured O-19. This is a counting rate of gamma rays derived from O-19 caused by neutrons having less than 10 MeV (Step S5), and therefore, by using this counting rate, a reaction rate of the O-18 (n, g)O-19 reaction having less than 10 MeV in the observation range can be calculated (Step S6). Energy distribution of neutrons having less than 10 MeV can be calculated by using the calculated reaction rate and a database 2 (Step S7). Thus, it is possible to estimate the energy distribution of neutrons in the observation range together with the energy distribution of neutrons having 10 MeV or more.

Hereinafter, the database 1 and the database 2 will be described. An example of the database 1 is, for example, a fission spectrum of U-235. The fission spectrum is a spectrum of neutrons that are not moderated due to water and are emitted because of nuclear fission. High-energy neutrons are not easily moderated and can therefore be used as a database assuming that neutrons having 10 MeV or more at a position of the instrumentation tube are not moderated. At this time, instead of U-235, a fission spectrum of a nuclide causing a nuclear fission reaction, such as U-233, Pu-239, Np-237, Cm-244, or Am-241, may be used depending on a reactor type or a composition of a fuel or may be a fission spectrum obtained by combining the above nuclides depending on a situation. Further, as a similar database, Maxwellian distribution obtained by simulating a fission spectrum may be used. Another example of the database 1 is energy distribution of neutrons of a contribution ratio to a reaction rate or counting rate calculated for each power and each control rod insertion state in accordance with a reactor type in advance.

The whole reaction rate or counting rate may be allotted for each energy on the basis of this contribution ratio.

As to the database 2, neutron energy and a contribution ratio to a reaction rate or counting rate are calculated in advance for each power and each control rod insertion state in accordance with a reactor type in advance, and the whole reaction rate or counting rate is preferably allotted for each energy on the basis of the contribution ratio.

EXAMPLE 5

In the reactor instrumentation system including the gas flow pipe, it is necessary to determine a flow rate and a length of the gas flow pipe depending on an arrangement location of the nuclide analysis device. At this time, in the case where the flow rate needs to be increased for measurement, satisfactory neutron irradiation may not be performed on carbon dioxide gas in the reactor core 102. In particular, in the case where an arbitrary position is monitored by using a difference, a difference in counting rate may not be generated because a difference range is short and a difference between the length of the long gas flow pipe 105a and the length of the short gas flow pipe 105b is small. In this example, a structure of the gas flow pipe in the instrumentation tube will be described with reference to FIG. 6.

FIG. 6 illustrates the instrumentation tube 103 and the long gas flow pipe 105a and the short gas flow pipe 105b therein. Other structures are similar to the structures described in Example 2. In the case where two gas flow pipes are arranged in the instrumentation tube 103 as in this example, the instrumentation tube 103 needs to have a space through which four gas flow pipes pass. However, the short gas flow pipe 105b does not exist in a range serving as a monitoring target, and therefore the long gas flow pipe 105a may be arranged to run in a free space. Therefore, as illustrated in FIG. 6, the long gas flow pipe 105a can be provided to have a "spiral structure". A dotted line portion in FIG. 6 indicates a portion passing through "spiral" rings formed by the long gas flow pipe 105a. With such a structure, an irradiation amount of neutrons toward carbon dioxide in the long gas flow pipe 105a in an observation range is increased, and therefore generation amounts of radioactive materials (O-19, N-16) are increased. Thus, the nuclide analysis devices can obtain greater counting rates thereof.

In this example, a method for using a space with the use of a "spiral structure" has been described as an example. However, the method is not limited to the spiral structure. Any structure for increasing the length of the long gas flow pipe 105a running in an observation range can have a similar effect.

In this example, although an example where two gas flow pipes are arranged in an instrumentation tube has been described, the space may be used with the similar method in a situation in which one or three or more gas flow pipes are provided.

REFERENCE SIGNS LIST 101 reactor pressure vessel
102 reactor core
103 instrumentation tube
104 reactor containment vessel
105, 1051 to 1054 gas flow pipe
105a long gas flow pipe
105b short gas flow pipe
106 nuclide analysis device
106a nuclide analysis device for long gas flow pipe
106b nuclide analysis device for short gas flow pipe
107 suction mechanism
108 exhaust mechanism
109 monitoring device
110 transmission cable
110a transmission cable for long gas flow pipe
110b transmission cable for short gas flow pipe
111 measurement target range
121 to 125 monitoring boundary
201 to 204 neutron detector for local power range monitor

The invention claimed is:

1. A reactor instrumentation system for monitoring a state of a reactor, comprising:
    an instrumentation tube disposed in a reactor core;
    a gas flow pipe disposed in the instrumentation tube;
    a pump connected to the gas flow pipe and configured to supply gas containing oxygen into the gas flow pipe; and
    a nuclide analysis device connected to the gas flow pipe outside of the reactor core and configured to measure gamma rays emitted from one or more types of nuclides, including N-16, in the gas which has flowed out through the gas flow pipe in the instrumentation tube in the reactor core,
    wherein the gas flow pipe includes a plurality of pipes that extend different lengths in the same instrumentation tube in the reactor core, and the nuclide analysis device includes a plurality of nuclide analysis devices configured to respectively measure the gamma rays emitted from the plurality of pipes, and
    wherein a number of the gas flow pipes is equal to a number of neutron detectors in the reactor core and the gas flow pipes extend different lengths corresponding to the neutron detectors in the instrumentation tube.

2. The reactor instrumentation system according to claim 1, wherein
    the nuclide analysis device is further configured to measure gamma rays emitted from O-19 in the gas flow pipe.

3. The reactor instrumentation system according to claim 1, further comprising:
    a monitoring device connected to the nuclide analysis device and configured to monitor reactor power on the basis of a measurement result transmitted from the nuclide analysis device.

4. The reactor instrumentation system according to claim 1, wherein
    sensitivity of the neutron detectors is calibrated on the basis of a measurement result from the nuclide analysis device.

5. The reactor instrumentation system according to claim 1, wherein
    an energy distribution of neutrons at an observation position is estimated on the basis of measurement results of the gamma rays emitted from O-19 and N-16 generated by irradiating the oxygen in the gas flow pipe with neutrons in the reactor core.

6. The reactor instrumentation system according to claim 1, wherein
    the gas containing oxygen is carbon dioxide.

7. A reactor, comprising:
    a reactor pressure vessel; and
    a reactor core provided in the reactor pressure vessel,
    an instrumentation tube disposed in the reactor core;
    a gas flow pipe disposed in the instrumentation tube;

a pump connected to the gas flow pipe and configured to supply gas containing oxygen into the gas flow pipe; and a nuclide analysis device connected to the gas flow pipe and configured to measure gamma rays emitted from one or more types of nuclides, including N-16, in the gas which has flowed out through the gas flow pipe in the instrumentation tube in the reactor core, wherein the gas flow pipe includes a plurality of pipes that extend different lengths in the same instrumentation tube in the reactor core, and the nuclide analysis device includes a plurality of nuclide analysis devices configured to respectively measure the gamma rays emitted from the plurality of pipes, and wherein a number of the gas flow pipes is equal to a number of neutron detectors in the reactor core and the gas flow pipes extend different lengths corresponding to the neutron detectors in the instrumentation tube.

* * * * *